(12) United States Patent
Rao

(10) Patent No.: US 8,918,133 B2
(45) Date of Patent: *Dec. 23, 2014

(54) MOBILE BASED NEIGHBORHOOD WATCH SYSTEM AND CLIENT APPLICATION

(71) Applicant: Bindu Rama Rao, Laguna Niguel, CA (US)

(72) Inventor: Bindu Rama Rao, Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,969

(22) Filed: Aug. 6, 2013

(65) Prior Publication Data

US 2013/0316751 A1 Nov. 28, 2013

Related U.S. Application Data

(63) Continuation of application No. 13/010,785, filed on Jan. 21, 2011, now Pat. No. 8,548,423, which is a continuation-in-part of application No. 12/221,876, filed on Aug. 6, 2008.

(51) Int. Cl.
- *H04W 4/22* (2009.01)
- *H04W 4/08* (2009.01)
- *G06Q 10/10* (2012.01)

(52) U.S. Cl.
CPC *H04W 4/08* (2013.01); *G06Q 10/10* (2013.01)
USPC .......... 455/521; 455/404.1; 455/412.1; 455/420; 455/456.1; 455/552.1

(58) Field of Classification Search
CPC .......... G06Q 10/10; H04W 4/08; H04W 4/22
USPC ........ 455/426.1–426.2, 422.1, 403, 466, 455/414.1, 414.2, 410, 414.3, 435.1, 435.2, 455/435.3, 404.1, 404.2, 418–419, 416, 455/521, 456.3, 456.1, 420, 412.1; 370/310, 310.2, 328, 338, 343, 349; 709/229, 203, 218, 202, 104.1, 9, 10; 726/13, 3, 27

See application file for complete search history.

(56) References Cited

U.S. PATENT DOCUMENTS

| | | | |
|---|---|---|---|
| 2002/0180579 A1 * | 12/2002 | Nagaoka et al. | 340/3.1 |
| 2003/0162557 A1 * | 8/2003 | Shida | 455/521 |
| 2004/0082351 A1 * | 4/2004 | Westman | 455/518 |

* cited by examiner

*Primary Examiner* — Babar Sarwar

(57) ABSTRACT

A mobile based neighborhood watch system capable of group interactions, anonymous messages and observation reports. Employing a downloadable mobile client application in their mobile device, members of a local neighborhood watch group can send messages to each other, wherein messages can include voice recorded on their mobile devices and photos taken using their mobile devices. They can also provide comments on messages received, and make observation reports regarding a task they have conducted, something they have noticed, a situation they have witnessed, etc. The membership of the local neighborhood watch group is maintained by a server, and such membership typically includes people staying in a neighborhood, local law enforcement officials, local fire department workers, etc.

16 Claims, 3 Drawing Sheets

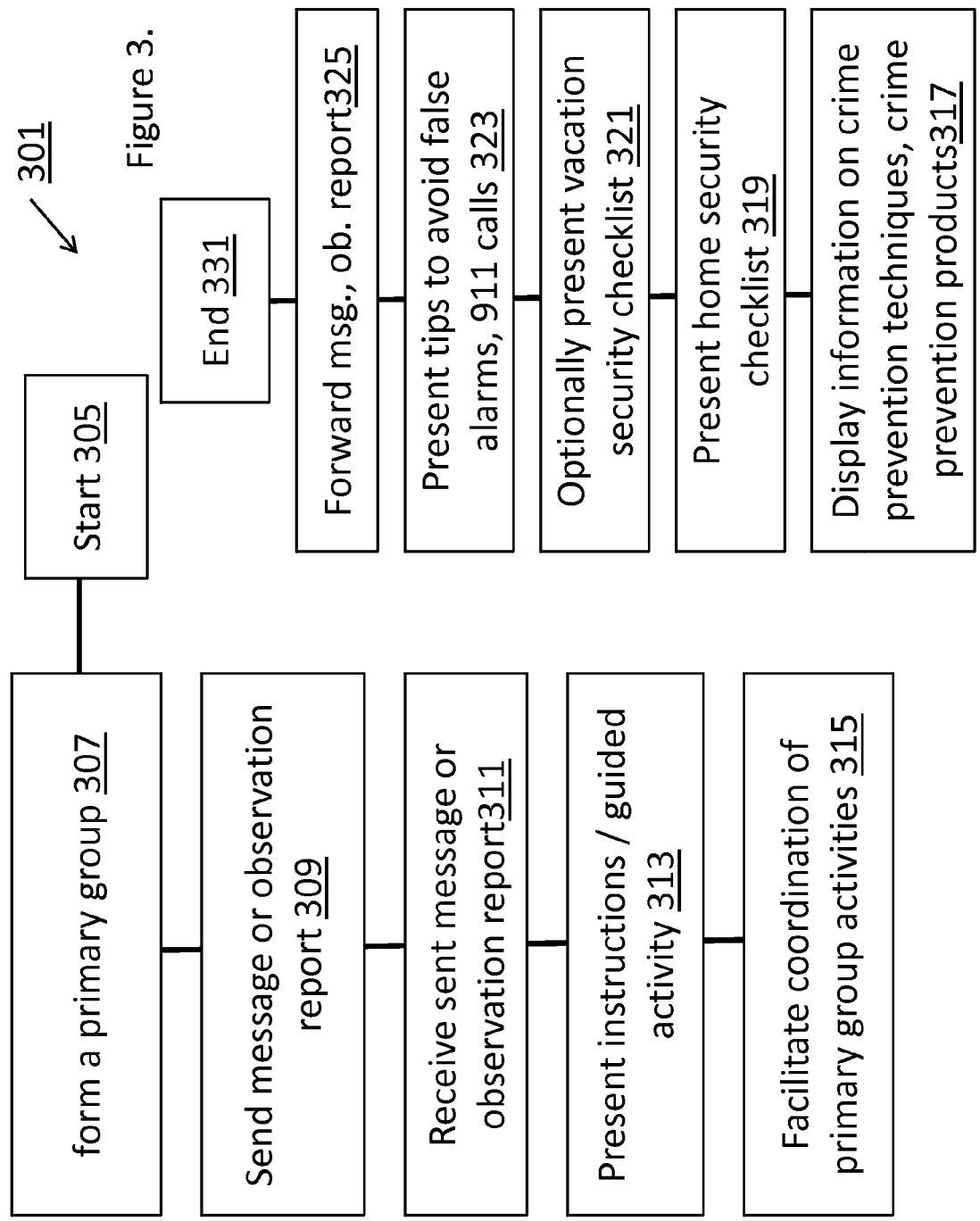

MOBILE BASED NEIGHBORHOOD WATCH SYSTEM AND CLIENT APPLICATION

CROSS REFERENCES TO RELATED APPLICATIONS

The present patent application is a continuation of, claims priority to, and makes reference to U.S. non-provisional patent Ser. No. 13/010,785, entitled "MOBILE BASED NEIGHBORHOOD WATCH SYSTEM CAPABLE OF GROUP INTERACTIONS, ANONYMOUS MESSAGES AND OBSERVATION REPORTS", filed on Jan. 21, 2011, which is a continuation-in-part of, claims priority to, and makes reference to U.S. non-provisional patent Ser. No. 12/221,876, entitled "MOBILE DEVICE FOR ACCESS TO AGRICULTURAL SERVICES BY NON-LITERATE AND SEMI-LITERATE USERS", filed on Aug. 6, 2008. The complete subject matter of the above-referenced United States patent applications is hereby incorporated herein by reference, in their respective entirety.

BACKGROUND

1. Technical Field

The present invention relates generally to security, and specifically to the use of mobile devices for neighborhood security monitoring and coordination.

2. Related Art

In the last decade, mobile devices of all kinds have proliferated all over the world. Some of them are small tiny cellular phones, others are more powerful and flexible smartphones, some are small electronic tablets and tiny netbooks, etc. All of these are very convenient to use.

The Internet is a very powerful communication means and quite often, the mobile devices available in the world can employ the Internet for communication. Most of them also employ the telecom networks (such as cellular networks) for communication. Some of the mobile devices can use both the Internet as well as the telecom networks for communications.

People using mobile devices such as mobile phones often find a camera embedded in the mobile phones and take pictures. Some of them are also capable of emailing these pictures to friends. Of late, some mobile devices have become capable of displaying digital videos and movies. Some of them are also able to capture small digital video clips.

Quite a few websites make it possible for a user to use his laptop or PC to upload photos to the websites. Such photos are typically uploaded to an album online and sometimes shared with friends. The YouTube service on the Internet makes it possible for a user to record a digital video and upload them from their laptop or personal computers to the YouTube server. Such videos can also be shared with friends.

There are currently no generally available means by which a group of people can collectively work together for a safe neighborhood, or currently participate in sharing information with their neighbors, or work together to keep neighborhoods safe. Neighborhood watch groups in some communities require people to keep an eye on things, call the police if there is a crime, call 911 in case of emergency. The use of technology is limited, and people make voice calls on cellular phones to sometimes keep in touch.

There are no easy to use methods by which all the people watching over their neighborhoods can share their observations with each other, especially if they have to make observations, talk about issues, warn each other, etc. There is no available solution currently in the market by which these neighborhood watch members in the community can share information about a local problem in their streets other than to walk around, knock on doors and talk to people.

Every day, people encounter situations calling upon them to be the eyes and ears of law enforcement. There is no easy way to do that other than calling 911 or the local police when there is an emergency. The neighborhood watch programs in different communities allow citizens to help in the fight against crime, but they are not equipped with the necessary tools and easy to use solutions that could make them effective. Neighborhood watch and other such programs provide an opportunity for communities to bond through service, but without sufficient technology deployment and easy and inexpensive tools, their efficacy is questionable at best.

In view of the foregoing considerations, it is clear that there is a need for an improved system and method that is capable of facilitating interactions between people who participate in neighborhood watch activities. There is a need for such members to share comments and observation regarding local issues.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 3 is a flow chart of an exemplary operation of the mobile based neighborhood watch system wherein a group can interact with each other using messages and observation notes while conducting neighborhood watch activities.

DETAILED DESCRIPTION OF THE DRAWINGS

The present invention provides a mobile based neighborhood watch system capable of group interactions, anonymous messages and observation reports.

Figure 1:
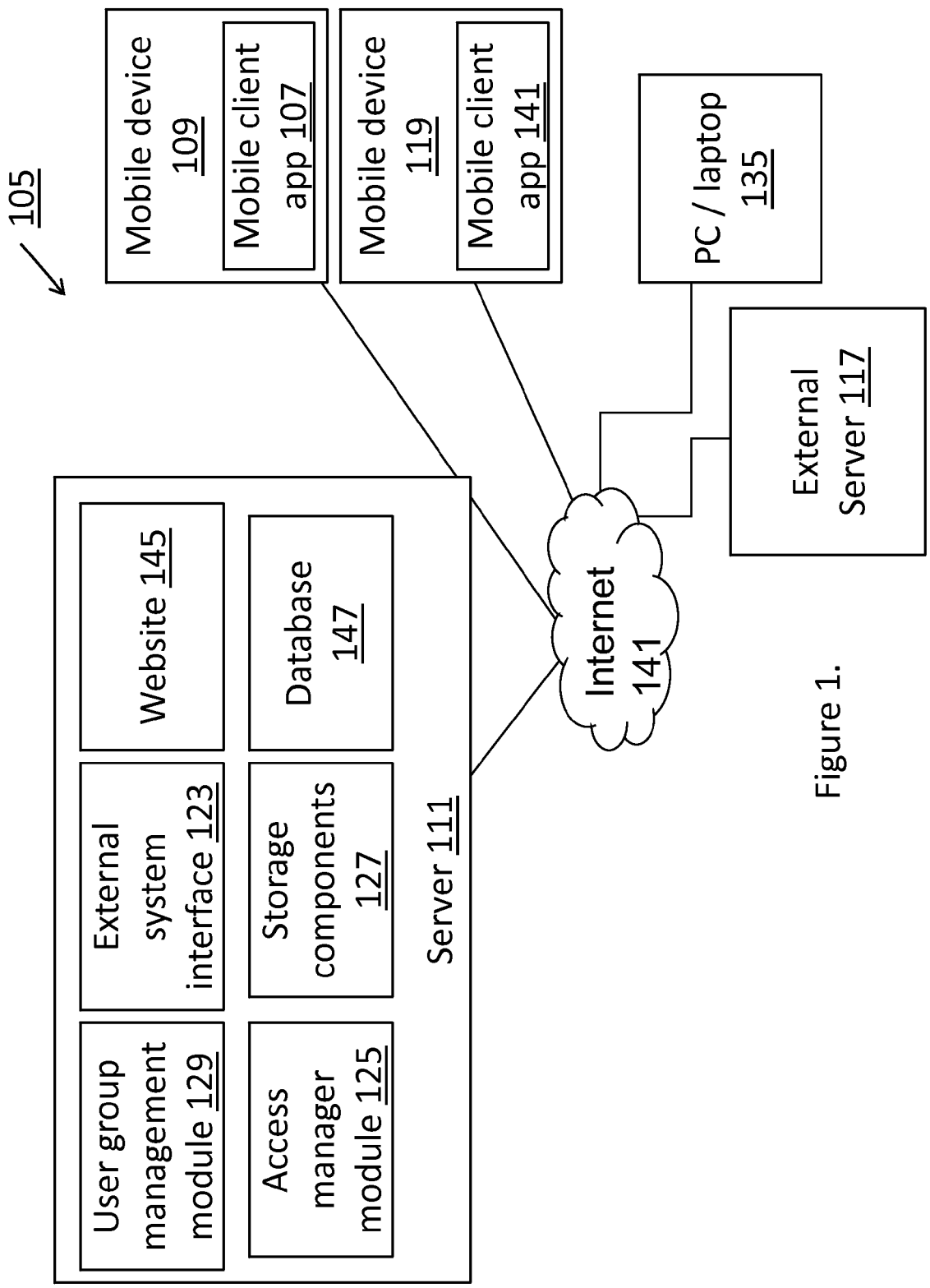
FIG. 1 is a perspective block diagram of a mobile based neighborhood watch system capable of group interactions, anonymous messages and observation reports wherein members of a neighborhood watch program interact with each other using mobile devices.

FIG. 1 is a perspective block diagram of a mobile based neighborhood watch system 105 capable of group interactions, anonymous messages and observation reports wherein members of a neighborhood watch program interact with each other using mobile devices 109, 119. Employing a downloadable mobile client application 107, 141 in their mobile devices 109, 119 respectively, members of a local neighborhood watch group can send messages to each other, wherein messages can include voice recorded on their mobile devices 109, 119 and photos taken using their mobile devices 109, 119. They can also provide comments on messages received, and make observation reports regarding a task they have conducted, something they have noticed, a situation they have witnessed, etc. The membership of the local neighborhood watch group is maintained by a server 111, and such membership typically includes people staying in a neighborhood, local law enforcement officials, local fire department workers, etc. The server makes it easy to create such groups and manage the membership.

The present invention facilitates registration of new neighborhood watch programs. Managers of new neighborhood watch programs can use the webpages provided by the server to register the new programs, make a new user group, and upload a list of members to make them members of that new user group. The user group can then download the mobile client onto their mobile devices and start interacting with each other, send messages to the whole group, etc. The present invention also makes it possible to register a new group from the mobile device of a user (such as a manager of the neighborhood watch) and upload a list of members or select a list of members for a new group created from the contact list of that user (manager of the group).

Once the group is registered the manager of the group will receive instructions on his mobile device (from the server 111) on how to hold neighborhood watch meetings, additional information about the neighborhood watch program, and other ideas to help the group interact. In addition, the server 111 provides links to online resources, access to online training, a calendar to organize events for the group, etc.

The neighborhood watch members and local law enforcement specialists participate in interactions facilitated by the present invention. For example, they can be members of the same group and send messages to each other, review observation reports sent by the members of the group, etc. Such collaboration helps in tracking, and monitoring crime in any neighborhood, including the trafficking of child pornography, identity theft, various forms of Internet fraud, hacking and network intrusion cases, harassing and threatening cases, and child exploitation cases.

The mobile based neighborhood watch system 105 comprises a plurality of mobile devices 109, 119 (each containing a mobile client such as mobile client application 107), the server 111 to which the plurality of mobile devices 109, 119 are communicatively coupled and a user group management module 129 in the server 111. The user group management module 129 in the server 111 facilitates creating a primary group of mobile users at the server 111, wherein the primary group comprises user contact information for a group of users associated with the plurality of mobile devices 109, 119. These members of the group of users are all typically resident in a neighborhood where the neighborhood watch is being conducted. For example, the primary group may contain 20 members who live on the same street in a small community, and include local law enforcement officers such as the local sheriff and his deputy. Optionally, a secondary group of members for a neighborhood watch group can be created, with members from local government such as a city clerk, a local judge, (in the county), a postman, a city council member, a local attorney, a fireman, etc.

The server 111 comprises the user group management module 129 used to create and manage user groups such as the primary group of mobile users for an exemplary neighborhood watch group, an external system interface 123 used to interact with external systems such as an external server 117, storage components 127 (including databases that are necessary), and an access manager module 125 that can be used to set or manage passwords, security credentials, etc. The user group management module 129 is also used to create and manage user accounts, manage subscriptions if necessary, create user profiles, etc. The server 111 also comprises a database 147 where neighborhood watch group registration data is stored, details of members are stored, observation notes and messages are stored until archived or deleted, and calendar of events for the groups are stored.

The mobile client application (such as 107, 141) in each of the plurality of mobile devices (such as 109,119) is used for sending one of an anonymous message, a regular message or an observation report to one or more members of the primary group, who receive them via their associated ones of the plurality of mobile devices 109, 119. The mobile client application 107, 141 in each of the plurality of mobile devices 109, 119 respectively, are also capable of receiving and displaying the anonymous message received, the regular message received, or the observation report received. The mobile client application 107 in each of the plurality of mobile devices 109 enable the selection of a guided activity from the server 111 by a manager, or another user, and forwarding it to one or more of the plurality of mobile devices 109. In addition, the mobile client application 107 in each of the plurality of mobile devices 109 facilitates retrieving the guided activity from the server 111 and displaying it, based on user selection of that guided activity on the mobile client application 107.

In one embodiment the messages (anonymous message or the regular message) comprise at least one of a voice recorded by sender and a photo. For example, the user might record an audio message using the mobile client 107 on the mobile device 109, then take a photo on the same mobile device 109 using the mobile client 107, and then send the message using the mobile client 107, without any textual input necessary. The user's message is sent to the entire group, i.e. all members of the primary group for that neighborhood watch. These members of the primary group receive that message on their own mobile devices 109 or on the website 145 provided by the server 111.

In general, the mobile client 107 in the mobile device 109 facilitates creating and sending the anonymous message created by a user, where the sender's name, phone number or other particulars are not included. It also facilitates creating and distributing a regular message that includes the sender's name, phone number or other particulars. It facilitates creation by a user of an observation report that might include textual inputs, one or more photos, audio inputs (voice) and recorded video.

In general, the server 111 facilitates receiving and distributing the anonymous message sent by a user where the sender's name, phone number or other particulars are not included. It also facilitate receiving and distributing a regular message that includes the sender's name, phone number or other particulars, and the observation report sent by a user that might include textual inputs, one or more photos, recorded audio and recorded video.

In one embodiment, the server 111 presents a form to the one of the users on his corresponding mobile device 109 in order to facilitate creation of an observation report by the user, wherein the form comprises a plurality of user prompts soliciting a set of user inputs. The server 111 also collects the set of user inputs provided by the one of the users to the user prompts in the form and stores it for subsequent processing and distribution.

In another related embodiment, the mobile client 107 allows the user to make a new message anonymous when the user records the new message to send to at least one member of the primary group. The mobile client 107 on the mobile device 109, when requested by the user, shows information on suspicious activities and also lets the user report on suspicious activities that he may have witnessed. For example, mobile client 107 presents to the user (when requested by the user) the suspicious activity check list comprising solicitations for description of persons involved, descriptions of vehicles involved, descriptions of location and an address where a suspicious activity took place, and details of any crime or damage that the user had witnessed.

In general, the server 111 provides the website 145 that provides webpages to manage the primary group membership, add or delete members, create a secondary group of members, forward messages between groups, etc. The server 111 facilitates sending messages, forwarding information and distributing guided activities to the plurality of mobile device or a subset thereof. The guided activities provide instructions to a user on how to conduct a task, collect data, report information, etc. The server 111 sends guided activities to one or more of the plurality of mobile devices when it receives instructions to do so from a manager of the primary group. The server 111 also provides information on crime prevention techniques, information on crime prevention products, their installation and operations to a user based on anticipated needs or user requests. It also sends crime related statistics to one or more of the plurality of mobile devices 109, based on a user request from one of the plurality of mobile devices 109 or based on a perceived need in the neighborhood determined by the server 111.

In one embodiment, when requested by a member of the primary group from his mobile device 109, the server 111 sends a suspicious activity check list (or a set of user interaction screens) comprising solicitations for description of persons involved, solicitations for descriptions of vehicles involved, solicitations for descriptions of location and address where a suspicious activity took place, and a form for entering details of any crime or damage that the user had witnessed.

The law enforcement agencies benefit from the present invention in many ways, as it supports communications, outreach, officer safety, police reputation and community engagement. Thus, the present invention makes it possible to provide the necessary technical support and necessary technological resources to local law enforcement agencies and citizens to make local community based policing and neighborhood watch programs more useful and effective.

In fact, the present invention makes it possible for the local law enforcement officials, community leaders and others to participate in neighborhood watch programs and interact with the members, provide comments, review observations reports, etc. They can send messages and receive messages in the form of audio recording along with digital photos and videos they provide. The present invention makes it possible to simultaneously create a blog of events that are held as part of neighborhood watch program, in an automated mode (without any special setup or extensive operations) that can be shared with others. Most importantly, the present invention makes it possible for police and citizens to collaborate on crime prevention, as they participate as members of the neighborhood watch group (primary group for example).

In general, whenever a member of a primary group sends a message or observation report, the recipients for that message is determined by the type associated with the primary group. Thus, a newly posted message can be routed only to the managers of the primary group, and not to all the members, if necessary. For example, whenever a member of a primal group sends a message or observation report, it is sent to the managers (one or more) of that primary group. However, a message posted by any manager in a primary group goes to all the members of the group. The recipients or targets for messages can therefore be based on the configuration for the group. If the group is configured in such a way that message from a member is only sent to the managers, and a message from a manager goes to all the members, the primary group is called a "manager oriented" group. On the other hand, if every message sent is received by all the members, then the group is said to have been configured as a "user oriented" group. Both forms of groups have their use, and the manager of the group can set the configuration, as his preference, when creating a new group (can be subsequently changed if necessary). In addition, other types of groups are also contemplated, such as those that allow for "observers", where an observer can send messages to a group, but the messages only goes to the manager of the group. Observers do not receive messages typically sent to other members—they can only receive specific messages targeted to them, sent by the managers of the group where they are an observer. The concept of an observer is orthogonal to the above mentioned group types, in general.

In general, when the user sending a message or observation report requests that it be made anonymous, the mobile client 107 does not include user information along with the message or observation report. The server 111 receiving the message or observation report does not store user identification along with the message or observation report When it stores it in the database 147. For regular messages and observation reports, the server 111 receiving the message or observation report does (by default) store user identification along with the message or observation report when it stores it in the database 147—thus the sender is always known unless the sender requests that it be made anonymous. Other ways to make a message and observation report anonymous are also contemplated, such as modifying the voice message, etc.

Figure 2:
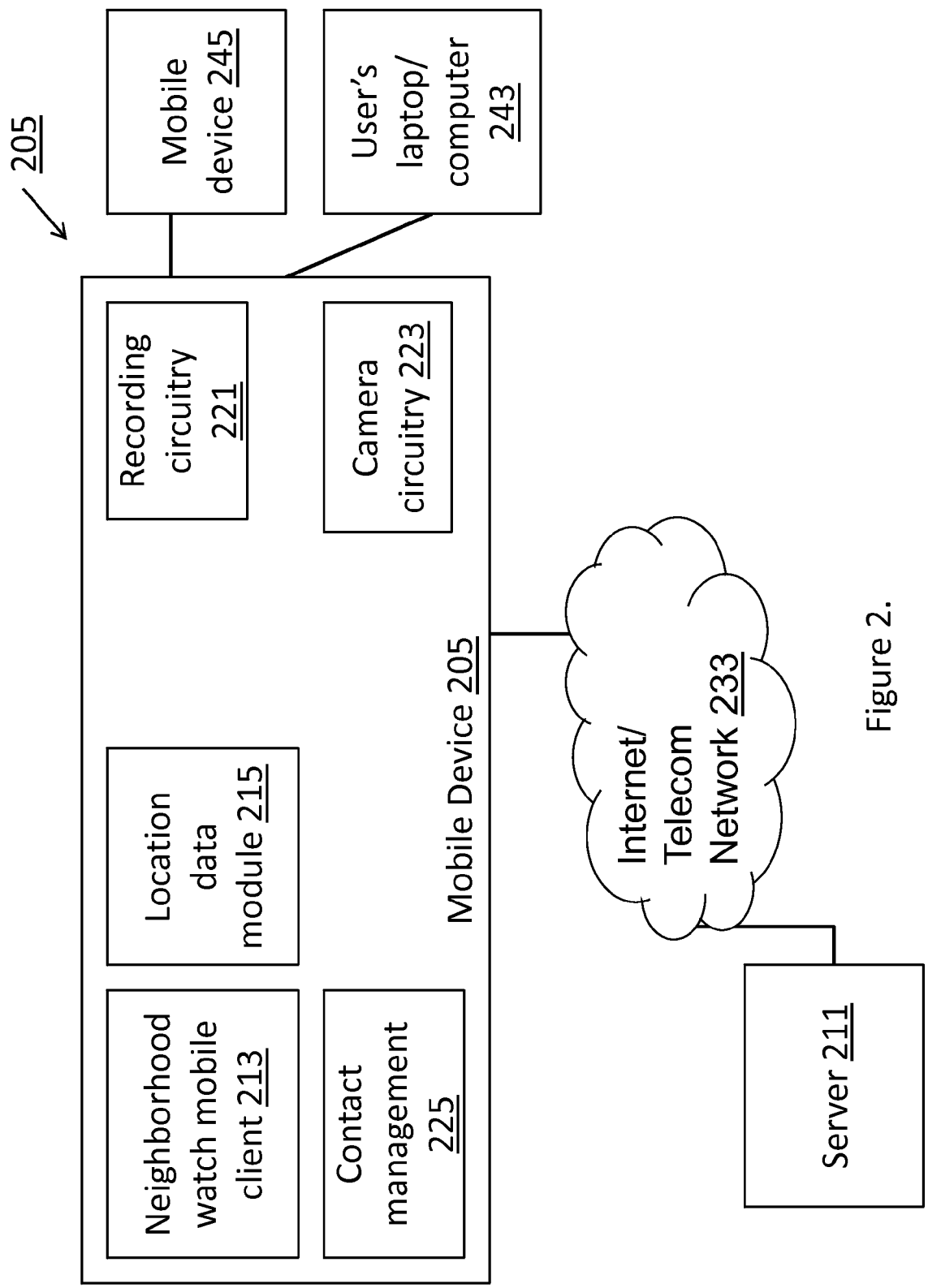
FIG. 2 is a perspective block diagram of a mobile device that facilitates user participation in a neighborhood watch program, wherein the mobile device can be used by a user to interact with others in the neighborhood watch group and send messages to them, receive instructions from them, etc.

FIG. 2 is a perspective block diagram of a mobile device 205 that facilitates user participation in a neighborhood watch program, wherein the mobile device 205 can be used by a user to interact with others in the neighborhood watch group and send messages to them, receive instructions from them, etc. The mobile device 205 is used for conducting neighborhood watch operations by a user. It is communicatively coupled to a server 211 that facilitates neighborhood watch activities. The mobile device 205 comprises a neighborhood watch mobile client 213 that interacts with the server 211.

The neighborhood watch mobile client 213 facilitates creating and sending messages to the server 211 for communication to one or more other similar mobile devices, wherein the messages are anonymous messages without any sender information, or regular messages with sender information, based on a user selection. The neighborhood watch mobile client 213 presents an observation report form to the user, when required, to enable the user to create an observation report and send it to the server 211.

The mobile device 205 also comprises a location data module 215 that determines a current location of the mobile device 205, wherein the location data is based on GPS coordinates or on cellular tower triangulation data. The neighborhood watch mobile client 213 determines a current location of the mobile device 205 employing the location data module 215 and communicates it to the server 211 along with each message or observation report that is sent to the server 211. The mobile device also receives from the server 211 information on crime prevention techniques, crime prevention products, their installation and operations, and crime related statistics, based on a user request from the mobile device 205 or based on a perceived need determined by the server 211.

The mobile device 205 retrieves from the server 211 a suspicious activity check list and displays it to the user. This is done when such a check list is requested by a user of the mobile device 205. A suspicious activity check list typically comprises input data entry prompts for description of persons involved, input data entry prompts for descriptions of vehicles involved and solicitations for descriptions of location and an address where a suspicious activity took place. It also comprises a form for entering details of any crime or damage that the user had witnessed.

In general, the mobile device 205 makes it possible for a user to create anonymous messages or messages with sender information, wherein the messages comprise a recorded voice input captured with the mobile device 205 and a photo taken with the mobile device 205. A recording circuitry 221 in the mobile device 205 facilitates audio recording. A camera circuitry 223 in the mobile device 205 facilitates taking a photo or a video. The mobile device 205 also comprises a contact management module 225 that is used to select one or more recipients, if necessary to send messages to them. This is sometimes necessary when the mobile client 213 is used to download and locally store a list of group members—only references to the group members and their names is downloaded and stored locally in the contact management module 225—phone numbers are not stored locally but are looked up as needed by the server 211 from its database of members.

The mobile device 205 is also capable of interacting over Bluetooth or WiFi (802.11 variants) with a second mobile device 245 in its vicinity, and with a laptop/personal computer (PC) 243. When it does communicate locally, it can send messages and observation reports locally with other mobile devices and laptops/PCs in its vicinity.

FIG. 3 is a flow chart of an exemplary operation 301 of the mobile based neighborhood watch system 105 wherein a group can interact with each other using messages and observation notes while conducting neighborhood watch activities. Processing starts at a start block 305 when the manager of a neighborhood watch group logins to the server 111 to create a new group or manage a existing group from the mobile device 109. The mobile client application 107 in the mobile device 109 facilitates the management of a neighborhood watch group by providing appropriate screens and functionality. Alternatively, it begins when the manager employs a PC/laptop 135 (instead of the mobile device 109) to access the website 145.

At a next block 307, the manager is prompted to form a primary group by the server 111 (for both mobile device 109 access or in the case of website 145 access), and the user can employ the mobile client app 107 to access group management features from the mobile device 109. The manager is allowed to provide user contact information for a primary group of members, for users trying to become members of a neighborhood watch team. The manager also is prompted to provide their associated mobile numbers for their mobile devices. The server 111 then sets up default user accounts and login information for the members of the newly formed neighborhood watch team/group. The users in the primary group being formed are all typically resident in the same neighborhood.

At a next block 309, the user of the mobile device 109 sends an anonymous message, a regular message or an observation report employing the mobile device 109. An anonymous message and a regular message comprise at least one of a voice recorded by the user on mobile device 109 and a photo captured by the user on the mobile device 109. They may also contain a textual message typed in using the keyboard (real or virtual) of the mobile device 109. In one embodiment, they may also contain a recorded video stream/file.

The recipients for the message are the members of the primary group. If the user is using a website 145 of the server 111 to send the message or an observation report, then the message/report is sent by the server 111 to all the members of the group. In one embodiment, whenever a member sends a message or observation report, the message goes only to the managers of the primary group, and not to all the members. However, a message sent by any manager in a group goes to all the members of the group. Recipients or targets for messages are thus based on the configuration for the group. If the group is configured to behave that way, then it is sometimes called manager oriented group. On the other hand, if every message sent is received by all the members, then the group is said to have been configured as a user oriented group. Both forms of groups have their use, and the manager of the group can set the configuration on his preference. In addition, other types of groups are also contemplated, such as those that allow for "observers", where an observer can send messages to a group, but the messages only goes to the manager of the group. Observers do not receive messages typically sent to other members they can only receive specific messages targeted to them, sent by the managers of the group where they are an observer.

At a next block 311, the mobile device 109 receives the sent message or observation report. Each user in a primary group is expected to receive that message or observation report on their mobile device or on the website 145 of the server 111. Then, at a next block 313, any instructions provided employing a guided activity (which is a content format in which instructions can be provided) is presented to the user in the mobile device 109. For example, one of the users of the primary group (or even an observer) can send a guided activity to the primary group (often in response to a previous message or inquiry). The guided activity is communicated to all the members of the primary group.

Then, at a next block 315, the mobile device 109 facilitates coordination of the primary group activities for the members of the primary group. The user of the mobile device 109 can coordinate group activities for the members of the primary group whenever he wants to, by selecting appropriate screen provided by the mobile client 107. Coordination may include setting up a meeting, setting up a neighborhood watch activity, etc. it can also include assigning tasks to members and ascertaining if these tasks are completed. Then, at a next block 317, the mobile client 107 of the mobile device 109 receives, from the server 111, and displays for the user, information on crime prevention techniques, crime prevention products, their installation and operations, and crime related statistics. The server 111 sends this based on a user request from the mobile device 109 or based on a perceived need in the neighborhood determined by the server 111.

Then, at a next block 319, the mobile client 107 of the mobile device 109 optionally (when requested by the user) presents a home security checklist that solicits user responses to questions regarding exterior doors, garage and sliding door security, protecting windows, outdoor security, overall security when away from home, and security for outdoor valuables and personal property. The user can access this feature on the mobile device 109 by activating appropriate screens provided by the mobile client 107.

Then, at a next block 321, the mobile client 107 of the mobile device 109 optionally (when requested by the user) presents a vacation security check list on the mobile device 109. The user is prompted to check radio buttons on that checklist to indicate if the items on the check list have been complied with.

At a next block 323, the mobile client 107 of the mobile device 109 optionally (when requested by the user) instructs the user on tips for avoiding false alarms at home and frivolous calls to the police and the 911 emergency systems. Then, at a next block 325, the mobile client 107 of the mobile device 109 facilitates forwarding of a message (anonymous or otherwise) or an observation report to another group or to an observer (other recipients in general). Such forwarding, in one embodiment, occurs with the help of the server 111, and in another embodiment, without the involvement of the server 111. For example, a messages or an observation report is forwarded by the user to an external system to selectively share them with police and other law enforcement organizations.

Then, at a next block 331, processing terminates at the end block.

In one embodiment, the observation report created by the mobile device 109 comprises a set of user inputs provided by the first one of the users in response to a form presented to user, wherein the form comprises a plurality of user prompts soliciting the set of user inputs from the user on the mobile device 109 for the webpages presented by the website 145).

In one embodiment, the anonymous message is created on the mobile device 109 based on user preference. Also, the anonymous message or the regular message is communicated only to one or more managers in the primary group based on group configuration (employing parameters that govern how the communications in the group are conducted).

In one embodiment, an observation report or a message also comprises a GPS coordinate gathered from the first mobile device and an optional streaming video captured by the user employing the mobile device 109.

In another embodiment, the mobile client 107 of mobile device 109 supports registration of users as members of the primary group. This involves completing a registration form presented to the user on the mobile device 109.

In another embodiment, the mobile client 107 of mobile device 109 supports activating a help call using the mobile device 109 that results in the server 411 sending an alert message to the primary group, along with other relevant data. It also supports showing, when requested by the user, on the mobile device 109, a suspicious activity check list comprising solicitations for description of persons involved, descriptions of vehicles involved, descriptions of location and address where a suspicious activity took place, and details of any crime or damage that the first one of the users had witnessed.

In general, the mobile client 107 of mobile device 109 supports retrieving an anonymous message, a regular message or an observation report in reverse chronological order from the server 111. The server 111 manages a collection of such data stored and managed by the server 111.

As one of ordinary skill in the art will appreciate, the terms "messages" and "blogging messages," as may be used herein, include all types of messages posted to be blogged by users witnessing or participating in neighborhood watch events. The terms "events" includes sporting events such as foot patrol, meetings, training, overseeing security at football and basket ball games, participating in musical events such as the orchestra, concerts, etc.

Although the present invention has been described in terms of sporting messages where audio recorded on the mobile device and photo captured on the mobile device are communicated as part of the message, it must be clear that the present invention also applies to other types of data that can be part of a message, such as text, video streams, charts, graphs, tables, html content, etc.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have, been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A method of supporting frequent or regular group interactions by a server, wherein the server is communicatively coupled to a plurality of mobile devices, the method comprising:

creating a plurality of neighborhood watch groups, by the server, as it receives user group creation requests;

assigning membership to the plurality of neighborhood watch groups as appropriate, by the server, as it receives membership requests from a plurality of users, each of the plurality of users using one of the plurality of mobile devices;

sending, by the server, a message or an observation report received from a first mobile device among the plurality of mobile devices to all the members of a first user group among the plurality of neighborhood watch groups, wherein the message or observation report is sent by a first user using the first mobile device among the plurality of mobile devices;

receiving and sharing, by the server, responses to the message or observation report that is provided by one or more members of the first user group via their respective ones of the plurality of mobile devices;

retrieving, by the server based on specific user selection, instructions to perform a monitoring task or a security related activity, and presenting them to at least one of the plurality of users, and communicating, by the server, information on crime prevention techniques, crime prevention products, their installation and operations, and crime related statistics to one or more of the plurality of mobile devices, based on the at least one of the plurality of users request from one of the plurality of mobile devices or a perceived need in a neighborhood associated with the at least one of the plurality of users;

sharing observation reports with local crime prevention groups and local law enforcement groups by making them accessible via a website associated with the server; and providing access, by the server, to observations and messages to the all the members from their own mobile devices;

tracking and monitoring crime in a specified neighborhood, by the server, based on observation reports and messages from the plurality of users, including thefts reported, vandalism and burglaries reported, the trafficking of child pornography reported, identity theft complaints received, various forms of Internet fraud reported, hacking and network intrusion cases reported, harassing and threatening cases reported, and child abuse or exploitation cases reported.

2. The method of claim 1 wherein the observation report comprises a set of user inputs provided by the first user in response to a form presented to the first user, wherein the form comprises a plurality of user prompts soliciting the set of user inputs.

3. The method of claim 1 wherein the guided activity provides instructions on conducting one of the following: completing a task, collecting data, reporting information, making observation reports, reporting a task conducted, reporting on something noticed and reporting on a situation witnessed.

4. The method of claim 1 wherein the message is one of an anonymous message or a regular message.

5. The method of claim 1 further comprising:
the server forwarding a message or observation report created by a member of the first user group to at least one member of a second user group.

6. The method of claim 1 further comprising:
registering, by the server, a new group when the server receives, from the mobile device of a user, details of the new group comprising a list of members, wherein the user providing the list of members is designated to be a manager of the new group; and
sending by the server, to a mobile device associated with the manager of the new group, instructions on how to hold neighborhood monitoring meetings, additional information about the neighborhood monitoring program, and other ideas to help the group interact.

7. The method of claim 1 wherein observation report sent by the first mobile device also comprises a GPS coordinate gathered from the first mobile device and an optional video captured by the first user employing the first mobile device.

8. A client application in a mobile device communicatively coupled to a server, the client application comprising:
the client application configured to receive first input from a user to create a new neighborhood watch group, the first input comprising a list of members and related member information;
the client application configured to send to at least one member of the neighborhood watch group via the server, one of a message, an observation report, a form to be filled with details, a guided activity for coaching, or an alarm reminding individual members of activities to be conducted;
the client application configured to receive from the user a second input on the mobile device, the second input comprising a request which the client communicates to the server; and wherein, in response to the second input sent to the server, the client application is configured to receive and display a suspicious activity check list comprising solicitations for description of persons involved, descriptions of vehicles involved, descriptions of location and an address where a suspicious activity took place, and details of crime or damage that the user had witnessed;

the client application receiving third input from the user on the mobile device, the third input comprising a request for information on crime statistics in the neighborhood; and wherein, the client application configured to be responsive to the third input by receiving and presenting information on crime prevention techniques, crime prevention products, their installation and operations, and crime related statistics.

9. The client application of claim 8, wherein the message comprises a digital image taken by the user on the mobile device, an audio recording, and a textual description and a GPS coordinate.

10. The client application of claim 8, wherein the message comprises a digital video captured on the mobile device and a GPS coordinate.

11. The method of claim 8, further comprising:
the client application configured to receive fourth input from the user of the mobile device, the fourth input comprising a request; and
wherein, responsive to the fourth input, the client application configured to receive and present from a first server system a home security checklist that solicits user responses to questions regarding exterior doors, garage and sliding door security, protecting windows, outdoor security, overall security when away from home, and security for outdoor valuables and personal property.

12. The method of claim 8, further comprising:
the client application configured to receive a fourth input from the user of the mobile device, the fourth input comprising a vacation period monitoring request; and
wherein, responsive to the fourth input, the client application is configured to receive and present, from a first server system, a commitment of additional patrol and observation by at least one member of the neighborhood watch group.

13. The method of claim 8, further comprising:
the client application configured to send one of an anonymous message, a regular message or an observation report to one or more members of a primary group of individuals in the neighborhood, who receive them via their associated ones of the plurality of mobile devices.

14. The method of claim 8, further comprising:
the client application configured to include, as members of a neighborhood watch group, local law enforcement officials and community leaders to participate in neighborhood watch programs.

15. The method of claim 8, further comprising:
the client application configured to automatically create a blog of events that form a part of neighborhood watch program, wherein the blog is accessible on Internet.

16. The method of claim 8, further comprising:
the client application configured to, when requested by the user, show information on suspicious activities in the neighborhood, and also let the user report on suspicious activities that the user may have witnessed.

* * * * *